April 10, 1951 D. W. FETHER 2,548,009
APPARATUS AND METHOD OF MAKING FRICTION LINING
Filed Dec. 8, 1947 4 Sheets-Sheet 1

Donald W. Fether
INVENTOR.
BY
ATTORNEY

April 10, 1951    D. W. FETHER    2,548,009
APPARATUS AND METHOD OF MAKING FRICTION LINING
Filed Dec. 8, 1947    4 Sheets-Sheet 4

Donald W. Fether
INVENTOR.
BY H. Calvin White
ATTORNEY

Patented Apr. 10, 1951

2,548,009

UNITED STATES PATENT OFFICE 2,548,009

APPARATUS AND METHOD OF MAKING FRICTION LINING

Donald W. Fether, San Jose, Calif.

Application December 8, 1947, Serial No. 790,337

11 Claims. (Cl. 18—9)

This invention has to do with the manufacture of friction lining, particularly in tape form for subsequent severance into sections applicable to brake shoes. More specifically, the invention is concerned with improvements in the manufacture of molded type friction lining by compression and extrusion of an appropriate lining-forming composition between rotating molding rolls.

Heretofore it has been common practice to form molded lining by the general procedure of delivering the material between peripherally spaced molding rolls and rotating the latter so that the material, usually together with metallic re-enforcement, are densely compacted and extruded in continuous, tape-like form from the rolls. It is found that a factor of critical importance insuring and maintaining the proper physical composition and form of the extruded lining, is control of the roll surface speeds, and particularly the relative rotative speeds of the roll surface. While all the considerations necessitating the requirements for controlled roll speeds may not have completely been determined, the following considerations appear to represent the major influences requiring variation of the relative roll speeds in accordance with changing conditions affecting the material fed to the rolls.

Typical of compositions molded to form friction lining are mixtures of asbestos with graphite or lamp black, together with such additives as linseed oil, resin or resin-forming compound, sulfur, and a thinner which is volatilized during the usual baking treatment. Different variables may change from time to time the physical consistency of the mixture being fed to the rolls. For example evaporation of the thinner in a given batch may cause the consistency of the batch to thicken during the course of its use. Also it is found that changes in atmospheric humidity, or other conditions affecting the moisture content of the batch, will influence its consistency to a degree requiring compensation.

Assuming the relative roll speeds to remain constant, appreciable changes in the composition and consistency of the batch material may affect the physical condition of the lining being extruded from the rolls, to degrees such that the lining becomes imperfect, or even unuseable, unless correction is made. As an illustration, assuming the material to be extruded between upper and lower peripherally spaced rolls, if the upper roll speed is too fast, in relation to the consistency of the material, the top surface of the extruded lining will have a ripple-like irregularity, requiring refinishing or discarding. If the roll speed is exactly right, the lining surface will be smooth, or where the roll surface is knurled, the lining surface will show an exact replica of the knurling.

In view of these considerations it is important that the roll speeds, or their relative speeds, be capable of immediate and exact adjustment to meet the requirements arising from unavoidable, and oftentimes unpredictable changes in the batch composition. For maintenance of continuous production of top quality lining, these requirements cannot be met simply by providing for roll speed variation between fixed or relatively widely differentiating intervals or speeds. Instead, the roll should be capable of adjustment to whatever exact speed, however great or small in relation to a previously set speed, that conditions at any time may demand.

Accordingly, my primary object is to provide for control of the relative roll speeds, and preferably also of the individual roll speeds at a progressive infinite number of speeds within the range of adjustment required to compensate for variations in the condition of the batch. As will appear, this object preferably is accomplished by providing individual drives for the rolls, and interposing between the power units and their respective rolls, adjustments having the stated characteristics. It has been demonstrated in commercial production that given the capacity for immediate and precision control of the roll speed, the present machine is capable of producing in continuous operation, great quantities of better quality lining than could be produced by conventional equipment of this kind.

The invention has various additional features and objects, all of which will be explained to better advantage in the following detailed description of an illustrative embodiment shown by the accompanying drawings, in which.

Figure 1:
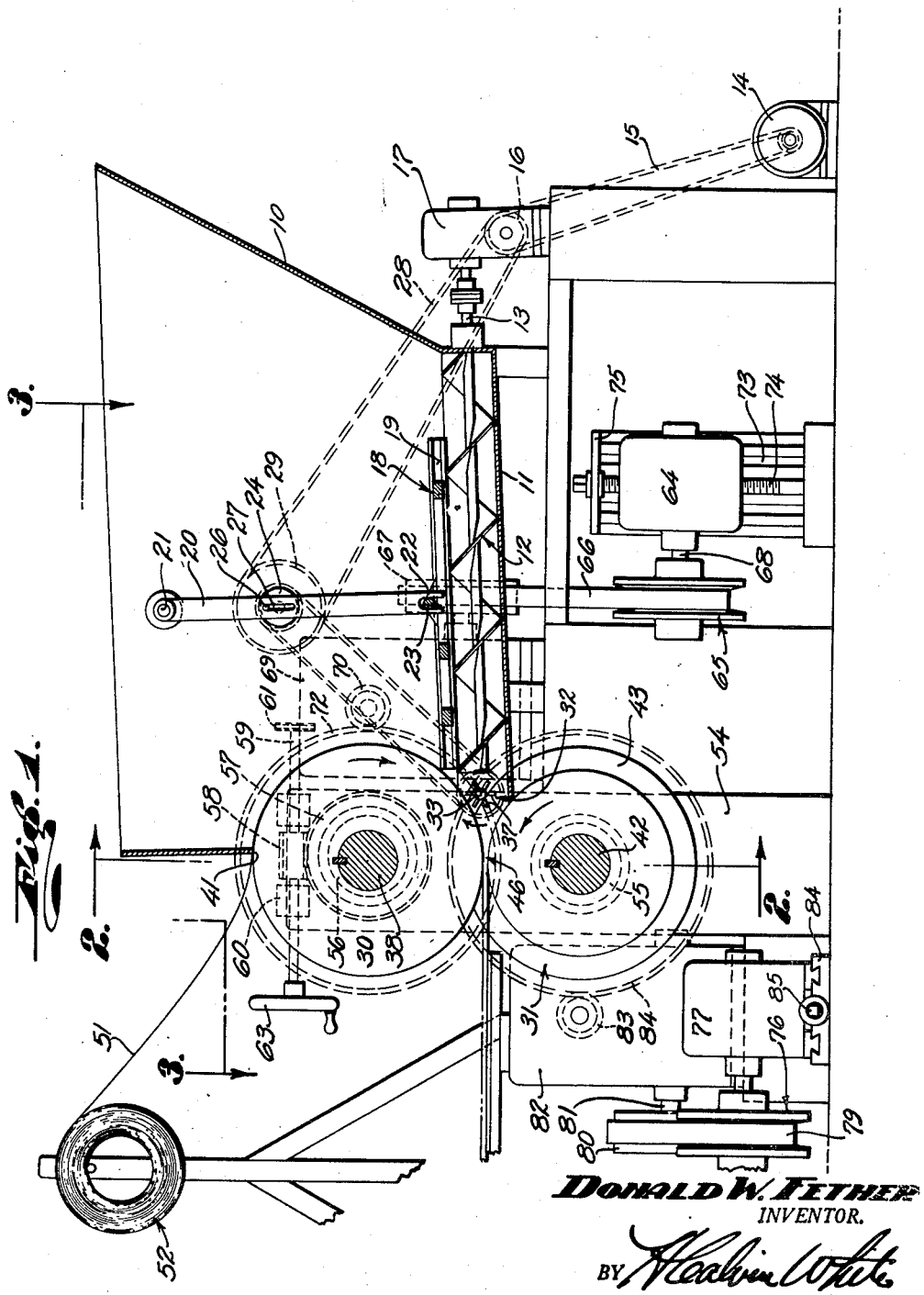
Fig. 1 is a longitudinal sectional view of the machine.

Referring first to Fig. 1, the machine is shown to comprise a hopper 10 which contains a mixture of the previously described type and composition to be compressed into friction lining form. The bottom of the hopper may have the form of an open top inclined cylindrical shell or trough 11 containing a feed screw 12, the shaft 13 of which is driven by motor 14 through chain 15, sprocket 16 and an appropriate speed reducing unit 17. The hopper also contains a reciprocating agitator and feeder 18 traveling in guideways 19, see Fig. 2, directly above the screw 12, the agitator serving to prevent compaction of the lining-forming material and assuring its free delivery to the screw. The agitator 18 is reciprocated within ways 19 by an arm 20 swinging on a pivot 21 and having a lower bifurcated end 22 which receives a pin or trunnion 23 carried by the agitator. Arm 20 is oscillated by rotation of a disc 24 rotating with its shaft 25 and carrying a pin 26 received within slot 27 in the arm. Shaft 25 may be driven in any suitable manner, as from the speed reducing unit 17 by way of chain 28 and sprocket 29 carried by the shaft.

Figure 8:
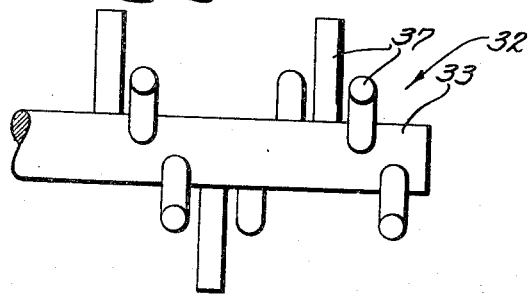
Fig. 8 is a fragmentary side view of the rotating feeder interposed between the screw and compression rolls.
Figure 9:
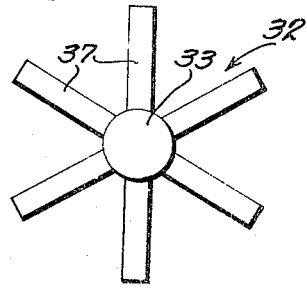
Fig. 9 is an end view of Fig. 8.

Beyond the free end of the screw 12, the material is advanced and forced into the peripheral space between the molding rolls 30 and 31 by a rotating feeder generally indicated at 32 and having the particular form shown in Fig. 8. The feeder 32 comprises a shaft 33 positioned directly between the convergent peripheries of the rolls 30 and 31 and rotated in the direction of the arrow (in Fig. 1) from shaft 25 by chain 34 on the sprockets 35 and 36, see Fig. 2. Shaft 33 carries a spiral arrangement of uniformly spaced fingers 37, as clearly illustrated in Figs. 8 and 9. The material advancing beyond the screw 12 is continuously thrust forwardly between the rolls in such compacted condition as to completely fill the inter-roll space and thus assure the presence between the rolls of the full amount of material required for uniform compression between the rolls. By virtue of its direction of rotation, the feeder 32 tends to displace excess material back toward the hopper.

Figure 2:
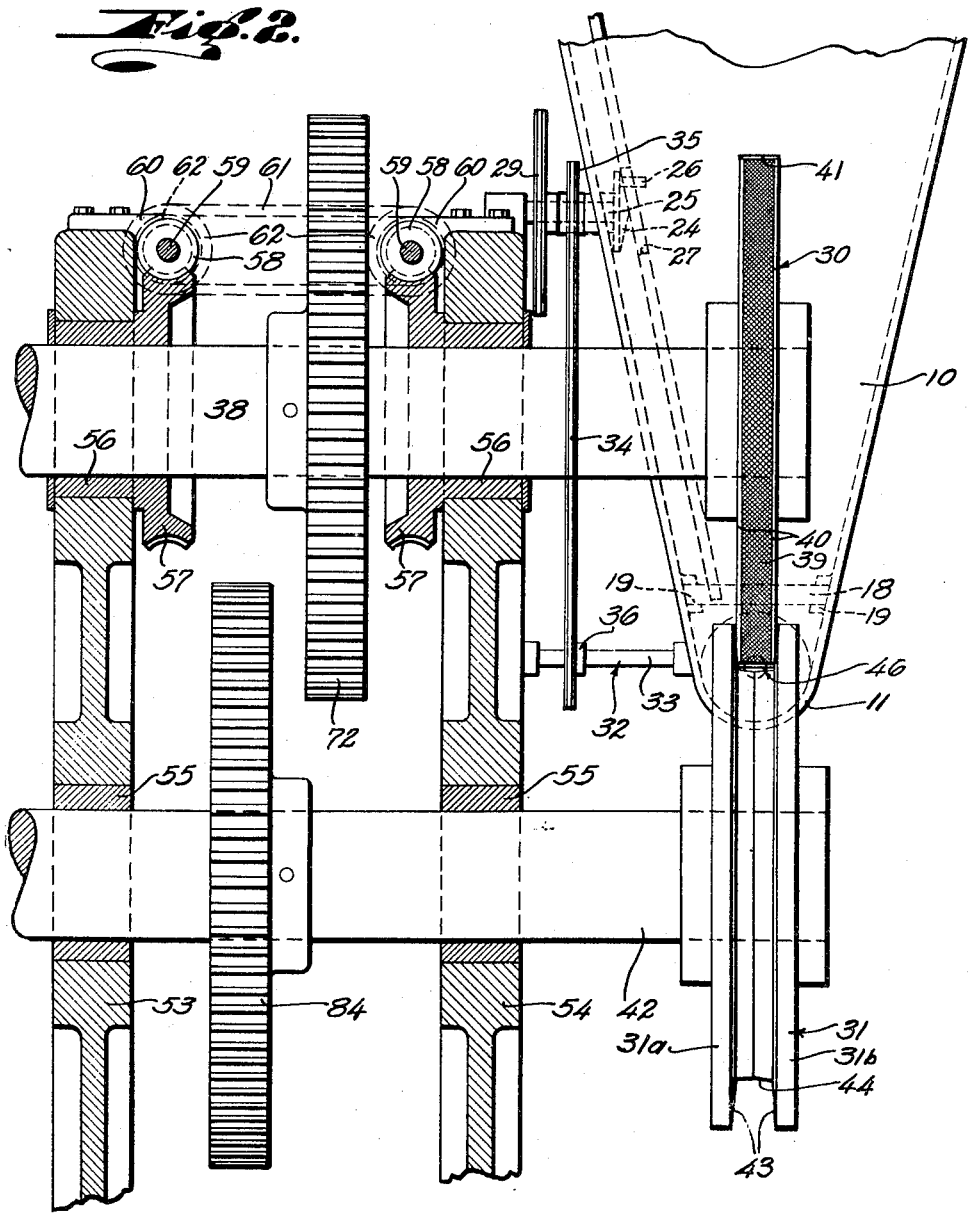
Fig. 2 is an enlarged fragmentary cross-section on line 2—2 of Fig. 1.

The upper roll 30 consists of a solid metal wheel carried on shaft 38 and having, as shown in Fig. 2, a knurled peripheral surface band 39 with marginal smooth surface bands 40. Roll 30 projects through opening 41 in the hopper wall and in direct contact with the material being fed between the rolls.

Figure 4:
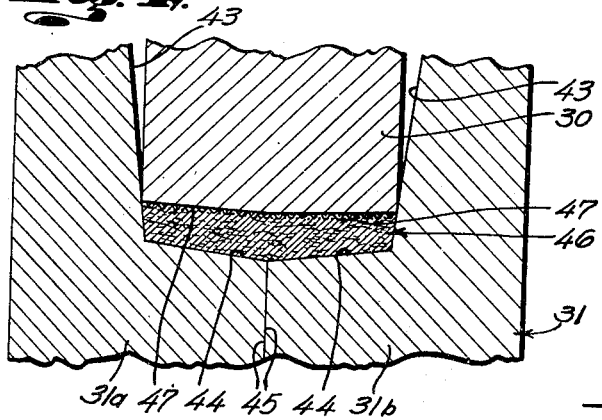
Fig. 4 is a fragmentary enlarged cross-section showing the compression roll surface shapes for formation of a relatively narrow friction lining.
Figure 5:
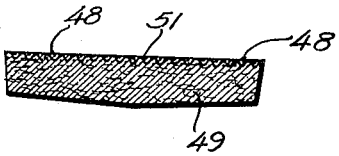
Fig. 5 shows the cross-sectional shape of the lining after extraction from the rolls and backed.
Figure 6:
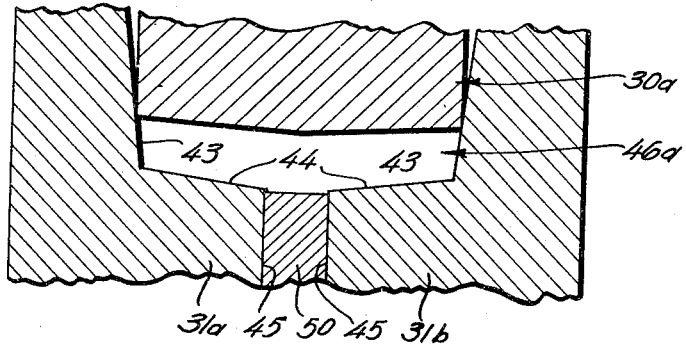
Fig. 6 is a view similar to Fig. 4 illustrating the adaptability of the rolls for formation of wider lining.
Figure 7:
Fig. 7 is a cross-sectional view of the lining extruded from the rolls of Fig. 6 and thereafter backed.

The lower roll 31, preferably of smaller diameter than the upper roll, is carried on a shaft 42 and positioned so that the rolls have the illustrated vertical alinement. As illustrated in Figs. 4 and 6, roll 31 may be formed in sections 31a and 31b having radially convergent inside surfaces 43 and bottom faces 44 inclined to the opposed faces 45 of the sections. The edges of roll 30 are maintained substantially in engagement with surfaces 43 to form a closed compression space 46 into which the lining-forming material is fed. The surfaces 47 of roll 30 at opposite sides of its transverse center have the slight angularity shown in Fig. 4 to allow for restoration of the corresponding surfaces 48 of the formed lining 49, after baking in the usual manner, to substantially straight or planar form. When it is desired to form a friction lining of greater width than that illustrated in Figs. 4 and 5, an annular shim 50 may be interposed between the lower roll sections 31a and 31b to widen the space 46a, and an upper roll 30a of corresponding greater width substituted for roll 30. In this instance the extruded and baked lining 49a has the shape illustrated in Fig. 7.

Provision is made for feeding to the inter-roll space 46 the usual woven wire tape which serves as a backing and re-enforcement for the molded lining. Referring to Fig. 1, the woven wire 51 is shown to be fed in tape form from reel 52 over and against the surface of the upper roll 30, so that the wire is carried around by the roll in contact with the material in the hopper and is then advanced against and on the under side of the roll through the space 46. In the course of its compression between the rolls, the lining-forming material tends to extrude through the wire mesh into direct contact with the surface of the roll 30.

At this point it may be mentioned that ordinarily the rolls 30 and 31 will be driven in the direction of the arrows in Fig. 1, at differential peripheral speeds. As illustrative, the relative peripheral speeds of the upper and lower rolls may in average operation be in the order of the ratio 25 to 22.

Figure 3:
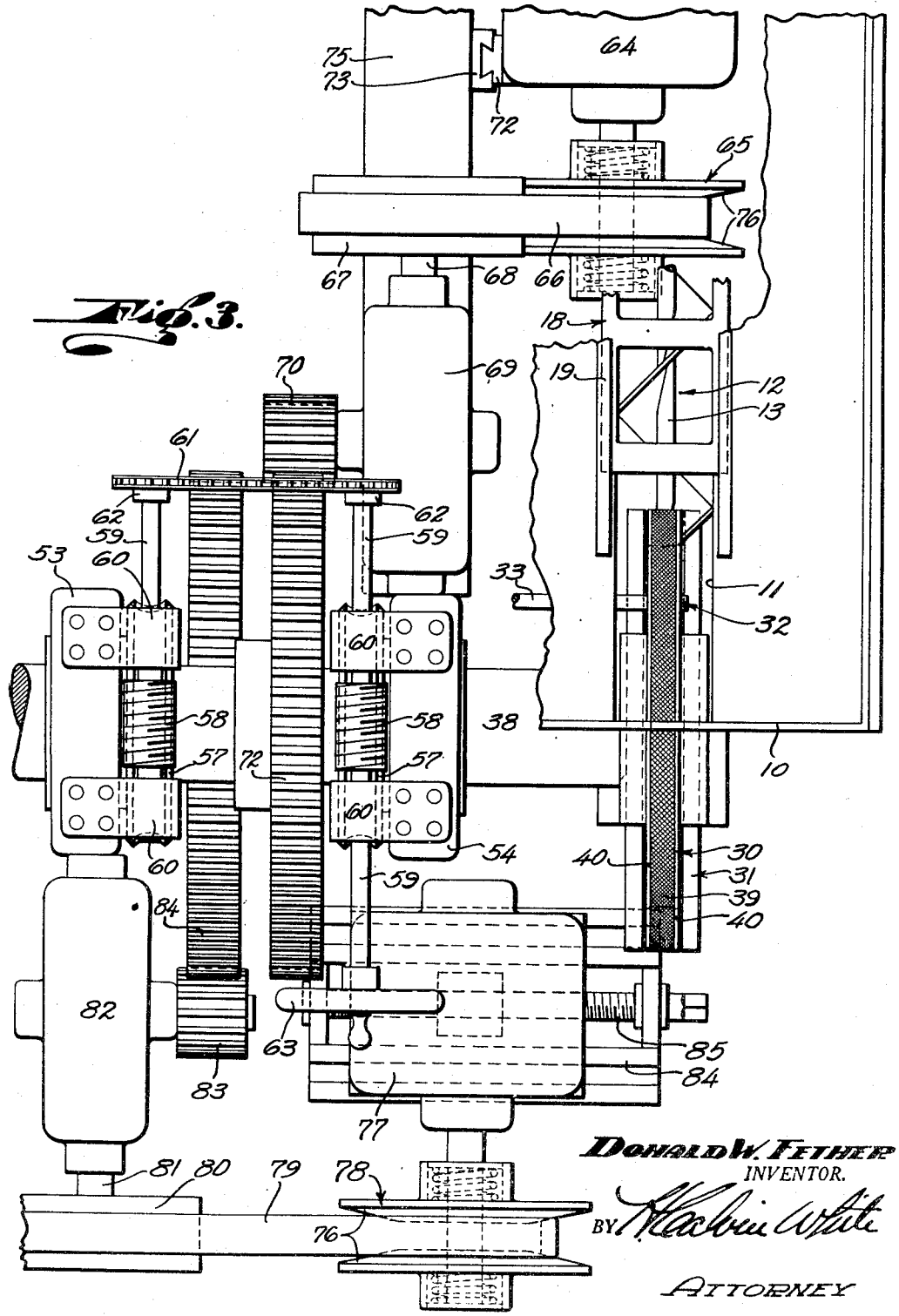
Fig. 3 is an enlarged fragmentary plan view taken on line 3—3 of Fig. 1.

Shafts 38 and 42 are supported by a pair of spaced standards 53 and 54, shaft 42 being journaled in a pair of fixed bearings 55 and shaft 38 in eccentric bearings 56. If desired, the shafts may be extended to carry the molding rolls, and to function as herein described, in a second tandem unit. As will be apparent from Fig. 1, vertical adjustment of roll 30 relative to the lower roll 31 may be effected by simultaneous and corresponding rotation of the eccentric bearings 56. Such adjustment of the bearings may be effected by providing them with integral spur gears 57 meshing with worm gears 58 on shafts 59 rotatable within bearings 60 attached to the standards 53 and 54. Referring to Fig. 3, the shafts 59 are interconnected for simultaneous rotation to correspondingly adjust the eccentric bearings, by belt or chain 61 carried by the shaft sheaves or sprockets 62, the adjustment being manually effected as by a hand wheel 63 carried by shaft 59.

Shaft 38 is driven by motor 64 by way of the motor shaft pulley 65, V-belt 66 and pulley 67 on shaft 68 of the speed reducing unit 69, the low speed shaft of which carries a gear 70 meshing with gear 72 on shaft 38. The invention particularly contemplates using a type of control or adjustment whereby the speed of shaft 38 and of the molding roll 30, may be varied between infinite increments within the variable speed range of the adjustment. Such control may be effected typically by providing for bodily adjustment of the motor 64, with resultant variation in the speed transmitted through unit 69 to the roll shaft. Thus the motor is shown to be carried by a base 72 slidable within a track or guideway 73, see Fig. 3, bodily adjustment of the motor being effected by a screw 74 carried by the support 75 and threaded through the base 72. The pulley assembly 65 may be of a known type responsive to variations of the belt tension to affect accordingly the speed transmission ratio. In this type of sheave assembly, one or both of the sheave flanges 76 are spring urged against the V-belt 66, so that as the belt tension is increased by adjustment of the motor, the effective pulley diameter is decreased by the relative spread of the belt-engaged flanges 76, and conversely as the belt tension is relieved.

Shaft 42 is driven from motor 77 by way of the motor shaft pulley assembly 78, V-belt 79, pulley 80 on shaft 81 of the speed reducing unit 82, the drive thence being transmitted from gear 83 on the unit shaft, to gear 84 carried by shaft 42. As in the case of motor 64, motor 77 is slidable on the guide support 84 as adjusted by the screw 85. The motor pulley assembly 78 is of the same type as the previously described pulley 65, in order that the speed transmitted to shaft 42 and the lower roll 31 may be varied within infinite increments of adjustment.

In the setting of the machine for operation, and with particular respect to the molding roll speeds, the speed of the lower roll 31 may be adjusted primarily on the basis of attaining for given conditions of material supply to the rolls, maximum rate production of the extruded lining. And by virtue of the capacity of the control for speed adjustment to any value within a workable range, the influence of the lower roll in forming and advancing the product material is controllable with corresponding exactness. Likewise the speeds and effects of the upper roll 30 are controllable with similar exactness by reason of the capacity of its speed adjustment for precision setting. As previously indicated, changes in such conditions as the composition, physical consistency (e. g. fluidity) of the material being fed to the rolls, or changes in the moisture content of the material due to atmospheric humidity fluctuations, are found to necessitate changes in the relative peripheral speeds of the rolls. It is found in actual practice that the conditions requiring compensation by variation of the roll speeds may develop both quickly and frequently, so that it is most desirable from standpoints of maintaining uniformity in the quality and form of the extruded lining, and a maximum production rate, that it be made possible to vary the relative roll speeds immediately as the necessity arises, and to the exactness required to correct any given condition, without interruption of throughput. As will be apparent from the foregoing, the capacity of the individual roller adjustments for precision setting meets the stated requirements. It may be mentioned that ordinarily the relative roll surface speeds will be regulated by adjusting the rotative speed of the upper roll 30.

I claim:

1. Apparatus for making friction lining, comprising a pair of molding rolls positioned in proximate spaced relation, means operable to mechanically feed lining-forming material for compression and advancement between the rolls from one side thereof, power means for driving the rolls, control mechanism adjustable to infinitely vary the relative speeds of the rolls within predetermined limits, and a movable feeder positioned directly between the convergent surfaces of the rolls at said side thereof and acting to compact the material before its compression between the rolls.

2. Apparatus for making friction lining, comprising a pair of molding rolls positioned in proximate spaced relation, a primary feeder, means operable to mechanically feed lining-forming material for compression and advancement between the rolls from one side thereof, power means for driving the rolls, control mechanism adjustable to infinitely vary the individual and relative speeds of the rolls within predetermined limits, and a movable secondary feeder means positioned directly between the convergent surfaces of the rolls at said side thereof and acting to compact the material before its compression between the rolls.

3. Apparatus for making friction lining, comprising upper and lower molding rolls positioned in proximate spaced relation, a primary feeder screw operable to mechanically feed lining-forming material for compression and advancement between the peripheries of said rolls from one side thereof, power means for driving the rolls, control mechanism adjustable to infinitely vary the relative speeds of the rolls within predetermined limits, and a rotatable secondary feeder positioned directly between the convergent surfaces of the rolls at said side thereof and acting to compact the material before its compression between the rolls.

4. Apparatus for making friction lining, comprising an upper molding roll and a smaller diameter lower molding roll positioned in proximate spaced relation, means operable to mechanically feed lining-forming material for compression and advancement between the peripheries of said rolls from one side thereof, power means for driving the rolls, control mechanism and adjustable to infinitely vary the relative speeds of the rolls within predetermined limits, and a rotatable feeder positioned directly between the convergent surfaces of the rolls at said side thereof and acting to compact the material before its compression between the rolls.

5. Apparatus for making friction lining, comprising an upper molding roll and a smaller diameter lower molding roll positioned in proximate spaced relation, means operable to mechanically feed lining-forming material for compression and advancement between the peripheries of said rolls from one side thereof, means adjustable to vary the peripheral spacing of the rolls, a pair of motors individually driving the rolls, individual control means between said motors and their respectively driven rolls adjustable to infinitely vary the individual and therefore relative speeds of the rolls within predetermined limits, and a movable feeder positioned directly between the convergent surfaces of the rolls at said side thereof and acting to compact the material before its compression between the rolls.

6. The method of making friction lining, comprising feeding and forcing a plastic mass between and from one side of a pair of power driven molding rolls positioned in proximate spaced relation for compression and advancement therebetween, compacting the material directly between the convergent surfaces of the rolls at said side thereof before compression of the material between the rolls, and varying the relative speeds of said rolls over infinite increments in accordance with the consistency of said mass.

7. Apparatus for making friction lining, comprising a pair of molding rolls, means for driving the rolls, a screw operable to feed lining-forming material for compression and advancement between the peripheries of the rolls, a rotating feeder receiving the material from said screw and positioned between the convergent peripheries of the rolls to thrust the material between them, and means for rotating said feeder independently of the screw.

8. Apparatus for making the friction lining, comprising a pair of molding rolls, means for driving the rolls, a screw operable to feed lining-forming material for compression and advancement between the peripheries of the rolls, a feeder rotatable about an axis extending transversely of the screw axis, said feeder receiving the material from said screw and positioned between the convergent peripheries of the rolls to thrust the material between them, and means for rotating said feeder independently of the screw.

9. Apparatus for making friction lining, comprising a pair of molding rolls, means for driving the rolls, a screw operable to feed lining-forming material for compression and advancement between the peripheries of the rolls, a reciprocating agitator cooperating with said screw and tending upon displacement in either of two reverse directions to advance lining-forming material toward said screw, means continuously actuating said agitator in said reverse directions, a rotating feeder receiving the material from said screw and positioned between the convergent peripheries of the rolls to thrust the material between them, and means for rotating said feeder independently of the screw.

10. Apparatus for making friction lining, comprising a pair of molding rolls, means for driving the rolls, a screw operable to feed lining-forming material for compression and advancement between the peripheries of the rolls, a reciprocating agitator cooperating with said screw and tending upon displacement in either of two reverse directions to advance lining-forming material toward said screw, means continuously actuating said agitator in said reverse directions, a feeder rotatable about an axis extending transversely of the screw axis, said feeder receiving the material from said screw and positioned between the convergent peripheries of the rolls to thrust the material between them, and means for rotating said feeder independently of the screw.

11. Apparatus for making friction lining, comprising a pair of molding rolls, means for driving the rolls, a screw operable to feed lining-forming material for compression and advancement between the peripheries of the rolls, a rotating feeder receiving the material from said screw and positioned between the convergent peripheries of the rolls to thrust the material between them, means for rotating said feeder independently of the screw, and control mechanism adjustable to vary infinitely the relative speeds of the rolls within predetermined limits.

DONALD W. FETHER.

REFERENCES CITED

The following references are of record in the file of this patent:

UNITED STATES PATENTS

| Number | Name | Date |
| --- | --- | --- |
| 1,342,114 | Iddon | June 1, 1920 |
| 1,542,119 | Wheatley | June 16, 1925 |
| 1,590,854 | Rothera et al. | June 29, 1926 |
| 1,936,843 | Jonsson | Nov. 28, 1933 |
| 1,964,177 | Rosner | June 26, 1934 |
| 2,067,360 | Vedder et al. | Jan. 12, 1937 |
| 2,178,955 | Draemann | Nov. 7, 1939 |
| 2,287,326 | Reeves et al. | June 23, 1942 |
| 2,434,707 | Marshall | Jan. 20, 1948 |

FOREIGN PATENTS

| Number | Country | Date |
| --- | --- | --- |
| 133,155 | Great Britain | Oct. 3, 1919 |